United States Patent
Lobo et al.

(10) Patent No.: US 7,206,188 B2
(45) Date of Patent: Apr. 17, 2007

(54) SYSTEM AND METHOD FOR LEVEL CONTROL OF AN ENCAPSULANT FOR CAPACITOR SECTIONS

(75) Inventors: Edward M. Lobo, Dartmouth, MA (US); Leonid Zayaruzny, New Bedford, MA (US)

(73) Assignee: Aerovox, New Bedford, MA (US)

( * ) Notice: Subject to any disclaimer, the term of this patent is extended or adjusted under 35 U.S.C. 154(b) by 0 days.

(21) Appl. No.: 11/073,751

(22) Filed: Mar. 8, 2005

(65) Prior Publication Data

US 2006/0203428 A1 Sep. 14, 2006

(51) Int. Cl.
*H01G 4/22* (2006.01)
*H01G 7/00* (2006.01)

(52) U.S. Cl. .................. 361/315; 361/301.3; 29/25.42
(58) Field of Classification Search ................ 361/273, 361/274.2, 299.5, 301.3, 315, 517–519, 535–537; 29/25.03, 25.41, 25.42
See application file for complete search history.

(56) References Cited

U.S. PATENT DOCUMENTS

| | | | |
|---|---|---|---|
| 4,240,126 A * | 12/1980 | Sanvito .................. | 361/274.1 |
| 4,317,158 A | 2/1982 | Dequasie | |
| 5,581,437 A * | 12/1996 | Sebillotte et al. .......... | 361/323 |
| 6,313,978 B1 * | 11/2001 | Stockman et al. .......... | 361/272 |
| 2005/0047058 A1 * | 3/2005 | Lobo et al. .............. | 361/301.3 |

OTHER PUBLICATIONS

Hudis et al., "Motor-Run Capacitors," Appliance Manufacturer, Oct. 1994.
Martin Hudis, "Technology Evolution in Metallized Polymeric Film Capacitors Over the Past 10 Years," presented at CARTS Symposium in Nice, France, Oct. 1996.
Martin Hudis, "Plastic Case Self-Protected Liquid Filled AC Capacitors for 70-degree Celsius Applications," presented at CAPTECH in Bangladore, India, Mar. 1997.

* cited by examiner

*Primary Examiner*—Eric W. Thomas
(74) *Attorney, Agent, or Firm*—Howrey LLP

(57) ABSTRACT

A self protected fluid filled capacitor that includes a capacitor section. Preferably, the capacitor section is configured to attach to a cover that can be placed on a capacitor housing. The capacitor contains an insulating fluid that surrounds the capacitor section when the capacitor section is inserted in the capacitor. A capacitor chamber that is configured to contain a retained portion of the insulating fluid and the capacitor section is also included. Also contained in the capacitor is an overflow chamber region in communication with the capacitor chamber. The capacitor chamber is configured to provide a capacitor chamber opening near a top portion, through which excess fluid contained in the capacitor chamber can flow. The overflow chamber region communicates with the capacitor chamber opening to receive excess insulating fluid, thereby providing a fluid volume margin to assure that the capacitor section is completely covered.

24 Claims, 5 Drawing Sheets

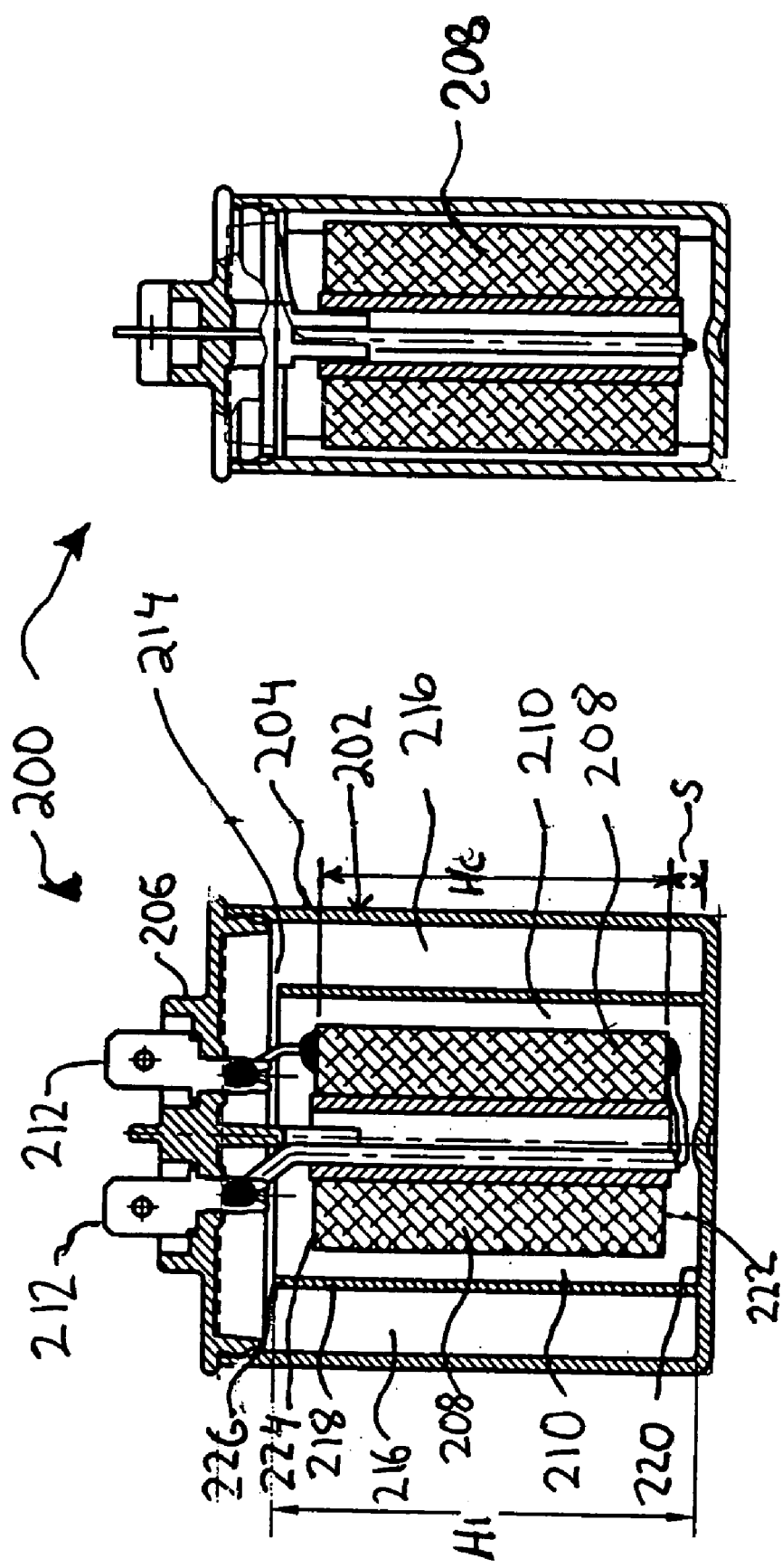

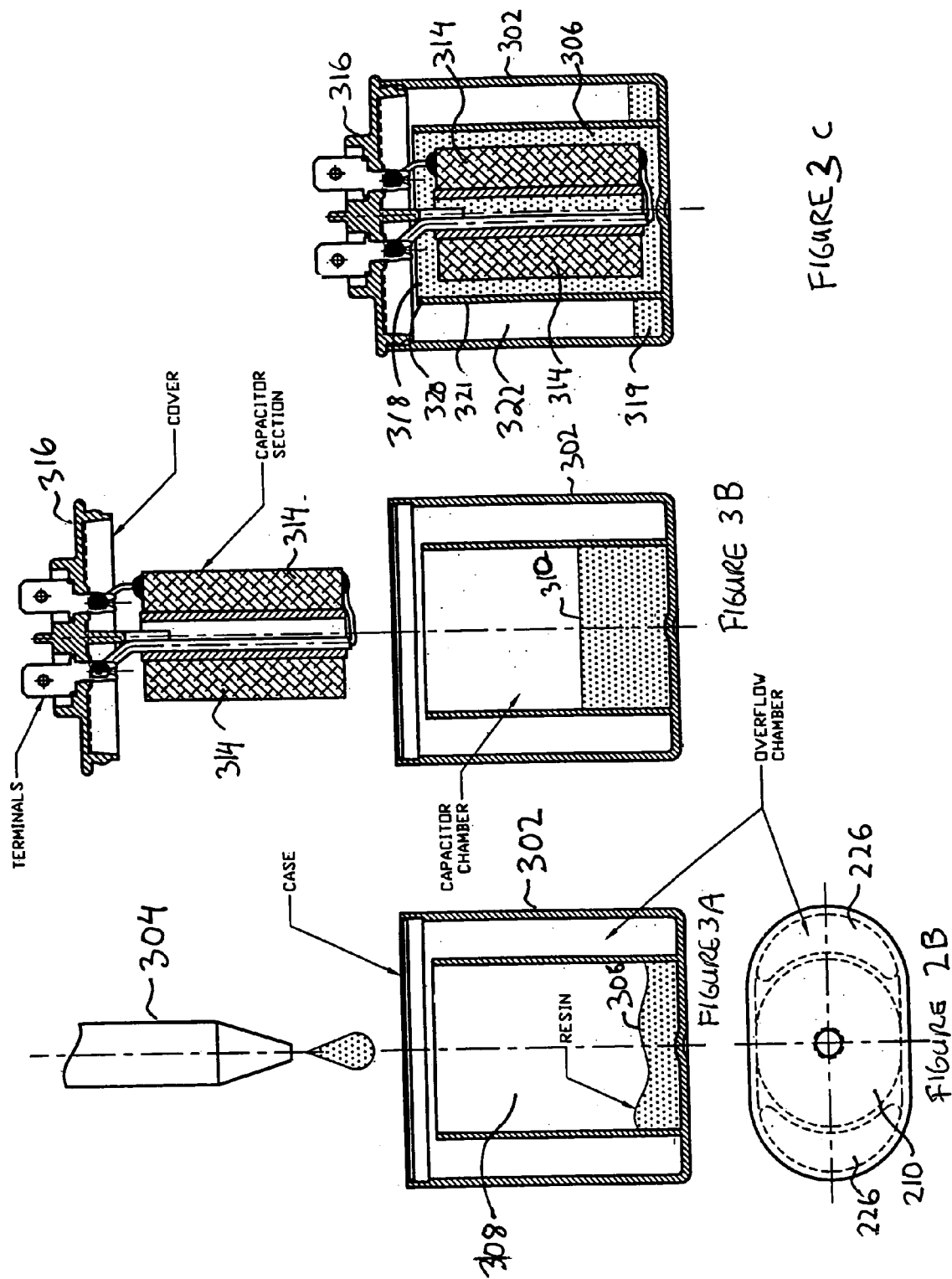

SYSTEM AND METHOD FOR LEVEL CONTROL OF AN ENCAPSULANT FOR CAPACITOR SECTIONS

BACKGROUND

1. Field of the Invention

The present invention relates generally to capacitor fabrication and more particularly to resin-filled AC capacitors.

2. Background of the Invention

High performance capacitors are often fabricated using a resin to cover capacitor elements. Typical capacitor designs employ a metal or plastic housing containing a chamber or chambers in which capacitor electrodes are inserted. FIG. 1 illustrates a high performance capacitor 100 of known structure. Capacitor 100 includes capacitor element (also hereinafter termed "section") 102, capacitor case 104, capacitor terminals 106, and cover 108. During assembly of capacitor 100, capacitor section 102 is attached to cover 108. Section 102 is subsequently inserted into case 104 by placing cover 108 over base 105 such that cover 108 comes to rest on a top portion of case 104. Insulating fluid (not shown) is provided within case 104 to improve capacitor performance. By encapsulating section 102, insulating fluid serves to reduce gas voids to increase voltage for corona inception, limit water vapor and oxygen attack on section 102, and scavenge any activated gas molecules generated in the vicinity of section 102. These features are especially important for operation voltages of AC capacitors above about 300 V.

Because optimal capacitor performance is dependent on each capacitor section being completely covered by fluid, it is important that sufficient fluid be dispensed within a capacitor case. Known methods for dispensing fluid include performing a first fluid dispense, visually inspecting the capacitor with cover in place to see how much additional fluid is required to completely coat the capacitor elements, and performing a second fluid dispense to provide sufficient additional fluid to completely cover the capacitor elements. FIG. 1A illustrates a capacitor 120 after dispensing of fluid 122 and placement of cap 124 on base portion 126. Upper portion 127 of capacitor section 128 remains clearly uncovered by insulating fluid, indicating that a second fluid dispense is desirable. However, the above procedure is tedious and requires more sensing and dispensing equipment and steps than ideal.

Alternatively, a precise volume of resin needed to coat capacitor elements can be determined and used to dispense the appropriate resin volume in a single dispense. However the latter approach requires that an exact volume of the capacitor case and capacitor section be determined. This typically requires special winding equipment or a closed loop feedback system that is built into a dispensing unit.

Another approach to ensuring that a proper amount of resin is dispensed is to perform visual monitoring during the dispense process. This results in a much slower dispense process and may nevertheless result in air bubbles generated in the dispensed resin, as well as requiring additional equipment to operate.

In light of the foregoing, it will be apparent that there is a need to improve fabrication processes for capacitors having encapsulated capacitor sections.

BRIEF SUMMARY OF THE INVENTION

In an embodiment of the present invention, a method for encapsulating capacitor sections includes a step of providing a capacitor chamber to house a capacitor section. Preferably the capacitor chamber is contained in a plastic or metal base. An overflow chamber is provided such that the overflow chamber is in communication with the capacitor chamber and preferably housed in the base common to the capacitor chamber. In another step, the capacitor chamber is filled with an insulating fluid of a predetermined fluid volume. In another step, the capacitor section is inserted within the capacitor chamber. Preferably, the capacitor section is affixed to a capacitor cover that seals the capacitor chamber and the overflow chamber. Preferably, the fluid volume of the insulating fluid in the capacitor chamber is chosen so that, when the capacitor section is fully inserted into the capacitor chamber, the level of insulating fluid retained in the capacitor chamber is sufficient to completely cover the capacitor elements. Preferably, the predetermined fluid volume is chosen such that a margin of error is accounted for to ensure that the level of retained insulating fluid is more than sufficient on average to cover the capacitor elements. Accordingly, any excess insulating fluid is communicated to the overflow chamber during insertion of the capacitor elements.

In another embodiment of the present invention, a self protected fluid filled capacitor includes a capacitor section. Preferably, the capacitor section is of known design. Preferably, the capacitor section is configured to attach to a cover that can be placed on a capacitor base. Also included in the capacitor is an insulating fluid that surrounds each capacitor section when the capacitor section is inserted in the capacitor. Preferably, the insulating fluid is a curable resin. A capacitor chamber that is configured to contain a retained portion of the insulating fluid and the capacitor section is also included. Preferably, the capacitor chamber is integrally formed within the capacitor base. Also contained in the capacitor is an overflow chamber in communication with the capacitor chamber and preferably formed integrally within the capacitor base. The capacitor is configured to provide a capacitor chamber opening near a top region of the capacitor chamber, through which excess fluid contained in the capacitor chamber can flow. The overflow chamber communicates with the capacitor chamber opening to receive any excess fluid flowing from the capacitor chamber.

In a further embodiment of the present invention, a case for housing self-protected capacitor elements includes a capacitor chamber to receive a capacitor section and a retained portion of insulating fluid. The case further contains an overflow chamber that is in communication with the capacitor chamber. The overflow chamber is configured to contain any insulating fluid displaced from the capacitor chamber. The case further contains a cover that is configured to hold the capacitor section and seal the capacitor chamber and overflow chamber when placed on a bottom portion (or "base") of the case. Preferably, the overflow chamber contains an opening or openings in a top region that communicate with the overflow chamber.

BRIEF DESCRIPTION OF THE DRAWINGS

FIG. 2 depicts a front cross-sectional view of self-protected fluid filled capacitor, according to one embodiment of the present invention.

FIGS. 2A and 2B illustrate a side cross-sectional view and top view, respectively, of the capacitor of FIG. 2, according to one embodiment of the present invention.

FIGS. 3A to 3C illustrate exemplary steps involved in a process for encapsulating capacitor sections, according to an exemplary embodiment of the present invention.

DETAILED DESCRIPTION OF THE INVENTION

Figure 1:
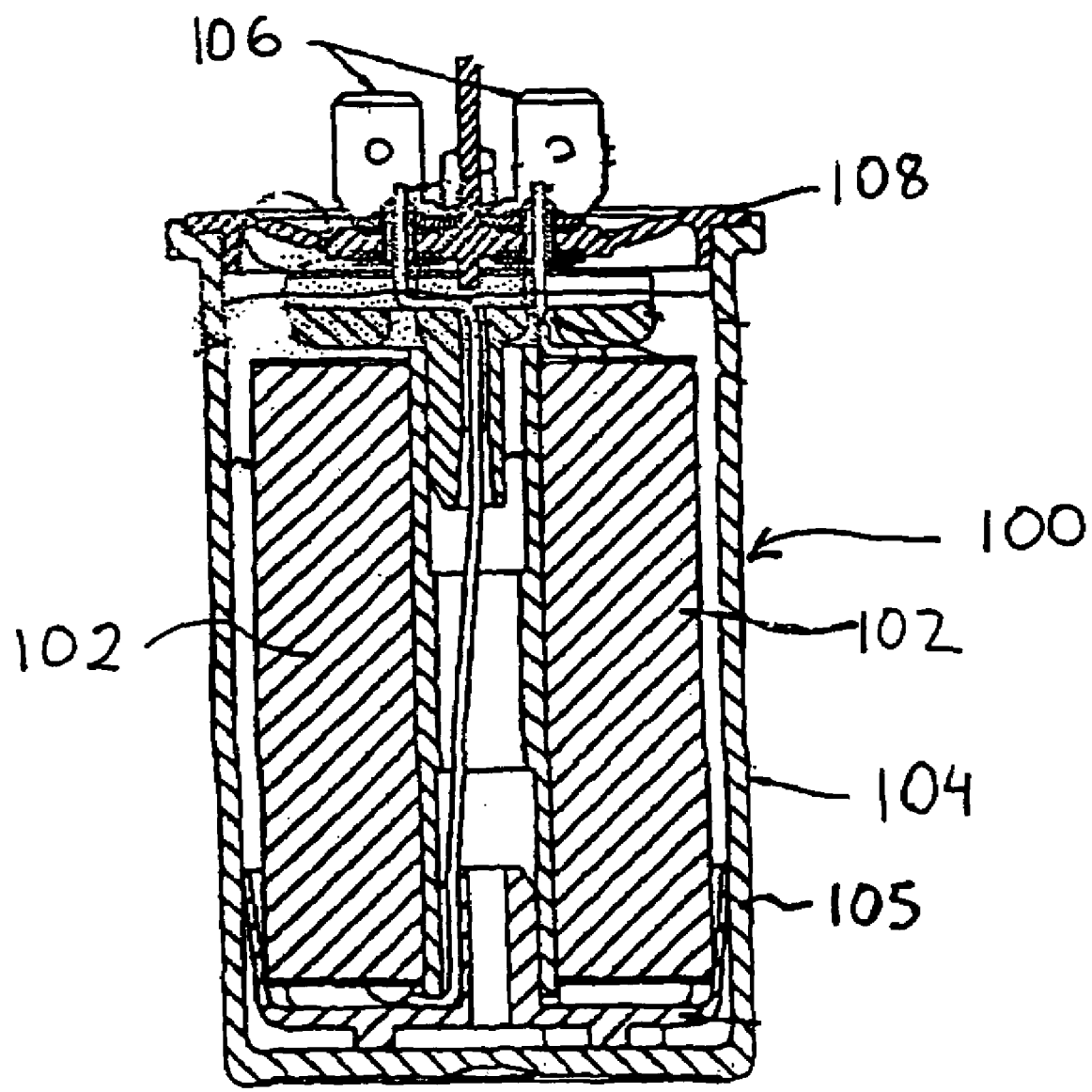
FIG. 1 depicts a self-protected fluid filled capacitor of known design.
Figure 1A:
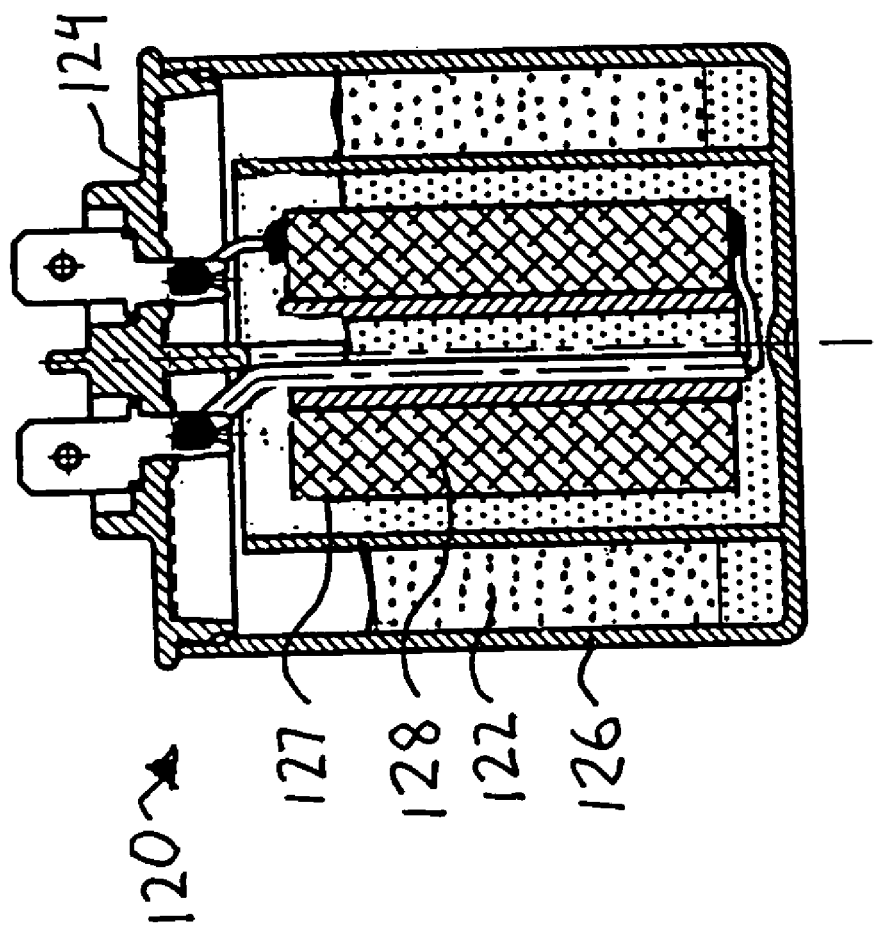
FIG. 1A depicts a known capacitor after partial filling of a capacitor chamber with insulating fluid.

FIG. 2 illustrates a cross-sectional front view of a capacitor 200, according to an exemplary embodiment of the present invention. As used hereinafter, the term "capacitor" refers to a device, such as device 200, that includes a case (or "housing") that contains individual capacitor elements. Capacitor housing 202 includes base 204 and cover 206. Cover 206 is attached to capacitor section 208 such that the section is suspended within capacitor chamber 210 when cover 206 rests on base 204. Section (also hereinafter referred to as "elements") 208 is preferably a metallized polymer capacitor element. Electrical connections to element 208 are made through contacts 212.

Capacitor chamber 210 is configured to contain an insulating fluid (not shown) that protects element 208 and thereby maximizes capacitor performance. In one embodiment, element 208 includes a metallized polypropylene capacitor structure. In an exemplary embodiment, element 208 includes rolled polypropylene film having a roll length greater than 100 meters.

In fabricating capacitor 200, insulating fluid is dispensed into chamber 210. When cover 206 with section 208 attached thereto is inserted into chamber 210 with insulating fluid residing therein, the insulating fluid flows around section 208 and coats the section up to a retained fluid level that is determined by the amount of fluid dispensed into capacitor chamber 210. Larger amounts of liquid dispensed into chamber 210 result in a higher retained fluid level and greater fluid coverage of element 208. If excess fluid is present in capacitor chamber 210, such that the fluid level rises to the top of chamber 210 when capacitor elements are inserted in the chamber, the excess fluid can flow through opening 214 into overflow chamber region 216.

As further illustrated in FIG. 2, a height H1 of capacitor chamber wall 218 is greater than a sum of the height Hc of capacitor section 208 and a separation S between an inner base surface 220 and bottom capacitor section surface 222 when cover 206 is affixed to base 204. A top surface 224 of capacitor section 208 is therefore located below a top surface 226 of capacitor chamber wall 218. Accordingly, chamber 210 can be filled with fluid to a level above that of surface 224, assuring that the entire surface of section 208 is covered with fluid. In this manner the entire capacitor element is protected from moisture and air by the insulating fluid diffusion barrier. Preferably, an operation voltage of capacitor 200 is equal to or greater than about 300 V AC.

The design of capacitor 200 provides that capacitor element 208 can conveniently be coated to a maximum extent without complicated procedures or equipment. A predetermined fluid volume to dispense into capacitor chamber 210 can then by chosen according to a preset criterion. For example, during capacitor assembly, an insulating fluid amount to be dispensed into capacitor chamber 210 can be estimated, such that the fluid level is most likely to cover completely the capacitor section after insertion of the latter into the capacitor chamber. In a first step, a minimum coverage volume that provides "just enough" fluid to cover capacitor section 208 when fully assembled can be calculated. In other words, when fully assembled, the top surface of fluid dispensed at the minimum coverage volume (not shown) in capacitor chamber 210 would be coincident with top surface 224 of capacitor section 208. The preset criterion in this example can be an amount determined to reasonably assure complete coverage of a capacitor section. For example, an excess fluid volume of about 10% of the minimum coverage volume can be chosen to add to the minimum volume, resulting in a predetermined dispense volume of about 110% of the minimum coverage volume. By choosing a fluid amount for dispensing that is estimated to more than cover capacitor element 208 after capacitor assembly, capacitor 200 is assured of complete fluid coverage and maximum performance. Furthermore, by providing an excess fluid volume, in a manufacturing process for large numbers of capacitors, slight variations in capacitor section volume, capacitor chamber volume, or fluid dispense volume will be much less likely to result in any capacitor section remaining uncovered by fluid after assembly.

Another preset criterion might be a maximum tolerable fluid fill volume. For example, a saturation fluid volume that would result in capacitor chamber 210 and overflow chamber region 216 being completely filled with fluid after capacitor insertion can be calculated. A maximum tolerable fluid volume can be set at a margin lower than the saturation volume, for example, about 20% less than the saturation volume. This ensures that excess fluid will not leak out of the capacitor during assembly. In one embodiment, the maximum tolerable volume is about 20%, more than the minimum coverage volume. Accordingly, in that embodiment the maximum tolerable volume corresponds to more than about 110% of the minimum coverage value, and it is more certain that a capacitor section will be covered with fluid than in the first scenario, where only about 10% excess fluid compared to the minimum coverage volume is added. However, on average, more fluid is used in the latter scenario during capacitor assembly.

FIGS. 2A and 2B show a side cross-sectional view and top view, respectively, of capacitor 200, according to one embodiment of the present invention. In this embodiment, housing 202 comprises a flattened oval shape as viewed from the top. Capacitor chamber 210 is disposed between two separate chambers 226 of overflow chamber region 216.

In other embodiments, housing 202 comprises a substantially circular shape as viewed from the top, and overflow chamber region 216 comprises a single cylindrical chamber, concentric with and surrounding an inner cylindrical capacitor chamber 210.

In a preferred embodiment of the present invention, housing 202 comprises a plastic material, although embodiments in which the housing is a metallic material have been contemplated by the present inventors.

FIGS. 3A–3C illustrate details of examples steps involved in capacitor element encapsulation, according to another embodiment of the present invention.

Figure 4:
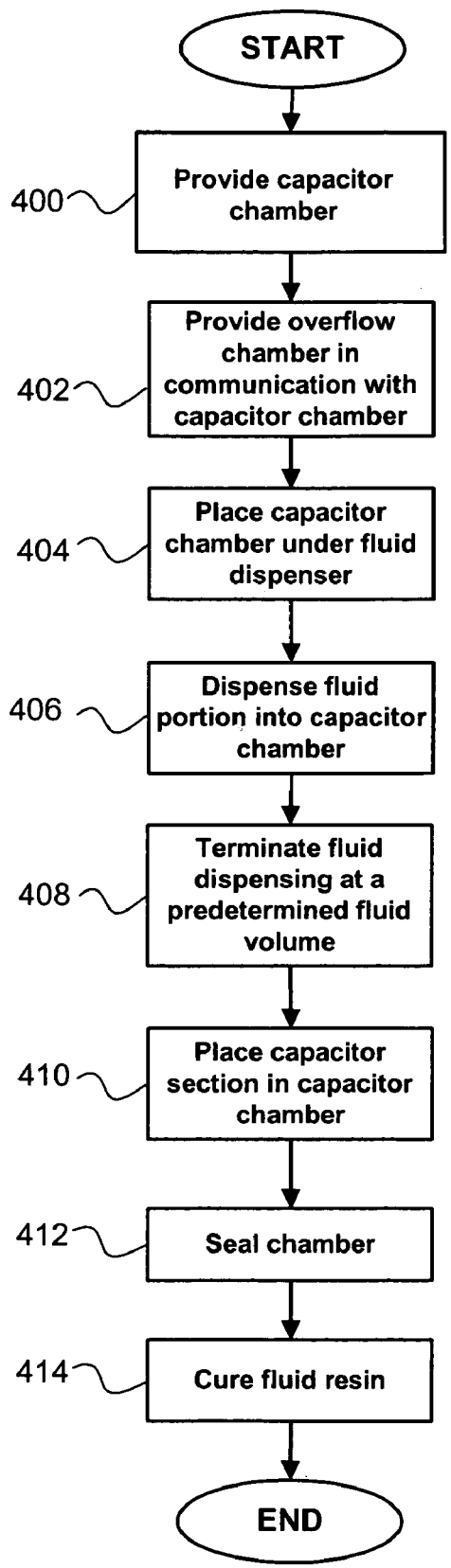
FIG. 4 illustrates exemplary steps involved in a method for encapsulating capacitor elements, according to one embodiment of the present invention.

FIG. 4 illustrates exemplary steps involved in a method for encapsulating capacitor elements, according to one embodiment of the present invention. In step 400, a capacitor chamber is provided to house the capacitor element. Preferably, the capacitor chamber comprises a plastic chamber that is integrally formed within a base of a capacitor.

In step 402, an overflow chamber is provided. Preferably, the overflow chamber is integrally formed within the same base as that housing the capacitor chamber. Preferably, the overflow chamber is configured to communicate with the capacitor chamber through openings located in a top region of the capacitor chamber.

In step 404, the capacitor chamber is placed underneath a fluid dispenser. The fluid dispenser preferably dispenses a curable resin that is designed to protect the capacitor section from corona inception and gas attack.

Referring also to FIG. 3A, in step 406 fluid resin is dispensed into the capacitor chamber. In FIG. 3A, for example, capacitor base 302 located under fluid dispenser 304 receives fluid resin 306 into capacitor chamber 308.

In step 408, dispensing of fluid resin is terminated when a predetermined volume is dispensed. As illustrated, for example, in FIG. 3B, dispensing of fluid into capacitor chamber 308 is terminated when the predetermined volume is such that a top surface 310 of fluid resin 306 reaches a predetermined level. In one embodiment, the predetermined level corresponds to an amount of fluid deemed necessary to cover a capacitor section, for example, section 314. In another embodiment, the predetermined volume corresponds to an amount of fluid that is about 10% greater than a volume calculated to provide complete coverage of a capacitor section when the capacitor section is placed within the capacitor chamber.

In step 410, the capacitor section is placed in the capacitor chamber. In the example illustrated in FIG. 3B, capacitor section 314 is affixed to cover 316 and is configured to enter chamber 308 when cover 316 is lowered onto base 302. As illustrated in FIG. 3C, for example, cover 316 is lowered onto base 302 and affixed thereto. Capacitor section 314 contacts and displaces fluid 306, such that a top level 318 of fluid 306 rises to top surface 320 of capacitor chamber wall 321. Capacitor section 314 is thus entirely submerged within fluid 306. An excess portion 319 of fluid 318 is communicated to overflow chamber 322.

In step 412, the capacitor chamber is sealed. For example, cover 316 is permanently affixed to base 302.

Subsequently, in step 414, the fluid resin is cured, such that the resin forms a solid.

An advantage of the above-illustrated capacitor section encapsulation process is a simplicity of assembly. Complete assembly requires a single fluid dispensing step and a single insertion of a capacitor section into a capacitor housing. Moreover, expensive monitoring equipment to detect fluid levels is unnecessary. By provision of an overflow chamber, a slight excess of fluid can be dispensed into a capacitor chamber, ensuring complete capacitor section coverage by the dispensed fluid.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for encapsulating a capacitor section of a liquid filled capacitor, comprising:
    providing a capacitor chamber to house the capacitor section;
    providing an overflow chamber in communication with the capacitor chamber;
    predetermining a fluid volume of an insulating fluid for covering the capacitor section;
    filling the capacitor chamber with the predetermined fluid volume of the insulating fluid; and
    inserting the capacitor section into the capacitor chamber, wherein a retained portion of insulating fluid that remains in the capacitor chamber completely covers the capacitor section, and wherein an excess amount of insulating fluid that is displaced during insertion of the capacitor section is retained in the overflow chamber.

2. The method of claim 1, wherein inserting the capacitor section further comprises:
    attaching the capacitor section to a capacitor cover; and
    lowering the capacitor cover onto a capacitor base that contains the capacitor chamber and overflow chamber.

3. The method of claim 2, wherein the capacitor cover is configured to seal the capacitor base that contains the capacitor chamber and overflow chamber.

4. The method of claim 1, wherein the step of predetermining the fluid volume comprises:
    calculating a minimum coverage volume for the insulating fluid; and
    adding an excess volume to the minimum coverage volume to ensure complete coverage.

5. The method of claim 1, wherein the step of predetermining the fluid volume comprises:
    calculating a saturation volume; and
    setting a maximum tolerable fluid volume at a margin lower than the saturation volume.

6. The method of claim 1, wherein the capacitor section comprises a metallized polymer section.

7. A self-protected fluid filled capacitor, comprising:
    a capacitor section;
    an insulating fluid that surrounds the capacitor section;
    a capacitor chamber that contains a retained portion of the insulating fluid and the capacitor section, wherein the retained portion of insulating fluid that remains in the capacitor chamber completely covers the capacitor section; and
    an overflow chamber region in communication with the capacitor chamber, wherein the overflow chamber region is configured to received a portion of the insulating fluid after final assembly of the self protected fluid filled capacitor.

8. The capacitor of claim 7, wherein the capacitor section comprises a metallized polypropylene section.

9. The capacitor of claim 7, further comprising:
    a base that includes the capacitor chamber and the overflow chamber region; and
    a cover that is configured to seal the base.

10. The capacitor of claim 9, wherein the cover is configured to attach to the capacitor section.

11. The capacitor of claim 9, wherein one or both of the base and cover comprise a plastic material.

12. The capacitor of claim 9, wherein one or both of the base and cover comprise a metal material.

13. The capacitor of claim 7, wherein the insulating fluid comprises a curable resin.

14. The capacitor of claim 7, wherein a height of a capacitor chamber wall is configured to retain the insulating fluid at a fluid level sufficient to completely submerge the capacitor section when the capacitor is fully assembled.

15. The capacitor of claim 14, wherein the height of the capacitor chamber wall associated with the capacitor chamber is greater than a sum of the height of the capacitor section and a separation between an inner base surface and bottom capacitor section surface when the cover is affixed to the base.

16. The capacitor of claim 7, wherein an operation voltage for the capacitor is equal to or greater than 300 V AC.

17. A capacitor case for housing a capacitor section of a liquid filled capacitor, comprising:
a capacitor chamber configured to receive the capacitor section and a retained portion of insulating fluid, the retained portion sufficient to completely cover the capacitor section;
an overflow chamber region in communication with the capacitor chamber and configured to contain insulating fluid displaced from the capacitor chamber;
a base containing the capacitor chamber and the overflow chamber region; and
a cover configured to hold the capacitor section and seal the capacitor chamber and the overflow chamber region.

18. The capacitor case of claim 17, wherein one or both of the base and cover comprise a plastic material.

19. The capacitor case of claim 17, wherein one or both of the base and cover comprise a metal material.

20. The capacitor case of claim 17, wherein the base and cover comprise a substantially circular shape as viewed from a top perspective.

21. The capacitor case of claim 20, wherein the overflow chamber region comprises a pair of overflow chambers located on opposite sides of the capacitor chamber.

22. The capacitor case of claim 17, wherein one or both of the base and cover comprise a flattened oval shape as viewed from a top perspective.

23. The capacitor case of claim 17, wherein a height of a capacitor chamber wall associated with the capacitor chamber is configured to retain the insulating fluid at a fluid level sufficient to completely submerge the capacitor section when the capacitor is fully assembled.

24. The capacitor case of claim 23, wherein the height of the capacitor chamber wall is greater than a sum of the height of the capacitor section and a separation between an inner base surface and bottom capacitor section surface when the cover is affixed to the base.

* * * * *